J. H. CHENOWETH.
HAT CHUCK.
APPLICATION FILED MAY 24, 1913.

1,125,963.

Patented Jan. 26, 1915.

Witnesses,
L. B. Mann
Emilie Rose

Inventor,
John H. Chenoweth
By Offield, Towle, Graves & Offield
Attys

UNITED STATES PATENT OFFICE.

JOHN H. CHENOWETH, OF CHICAGO, ILLINOIS.

HAT-CHUCK.

1,125,963.  Specification of Letters Patent.  Patented Jan. 26, 1915.

Application filed May 24, 1913. Serial No. 769,548.

*To all whom it may concern:*

Be it known that I, JOHN H. CHENOWETH, a citizen of the United States, residing at Chicago, in the county of Cook and State of Illinois, have invented certain new and useful Improvements in Hat-Chucks, of which the following is a specification.

This invention relates to improvements in hat chucks of that character adapted for supporting and rotating a hat while the latter is being cleaned and brushed.

The salient object of the invention is to provide an improved mechanism for conveniently adjusting the expansible jaws of the chuck to fit within hats of different sizes and to reliably hold the jaws in adjusted position so that they will neither expand under centrifugal action nor tend to change their adjustment during operation of the device.

A secondary object of the invention is to provide an adjusting mechanism which can be more quickly and more conveniently manipulated while at the same time no danger can arise from lack of properly fastening the adjusting devices.

Figure 1:
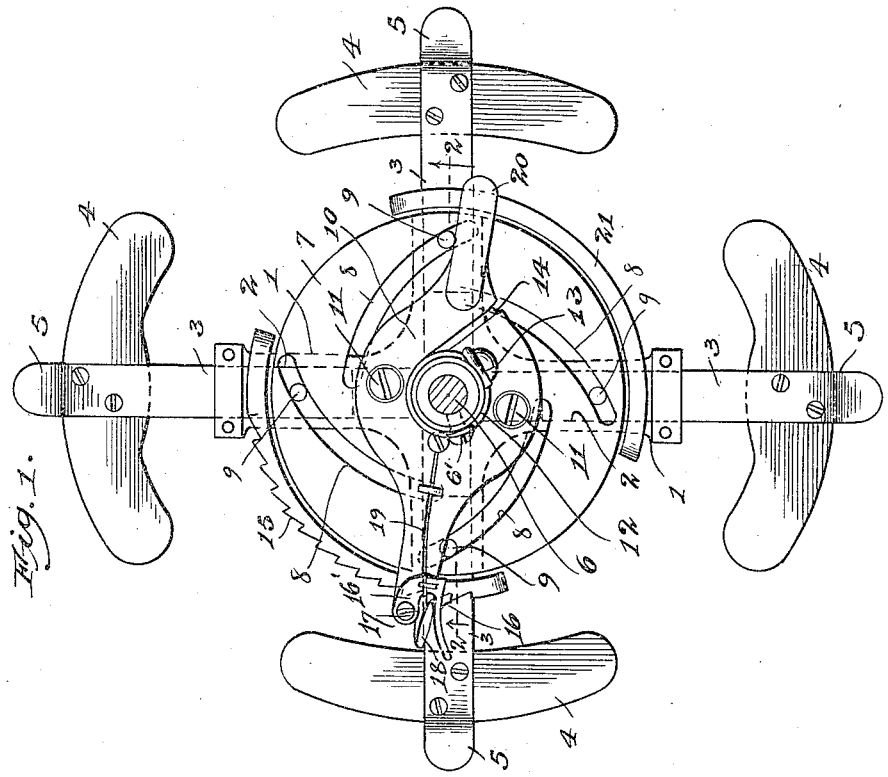
Figure 2:
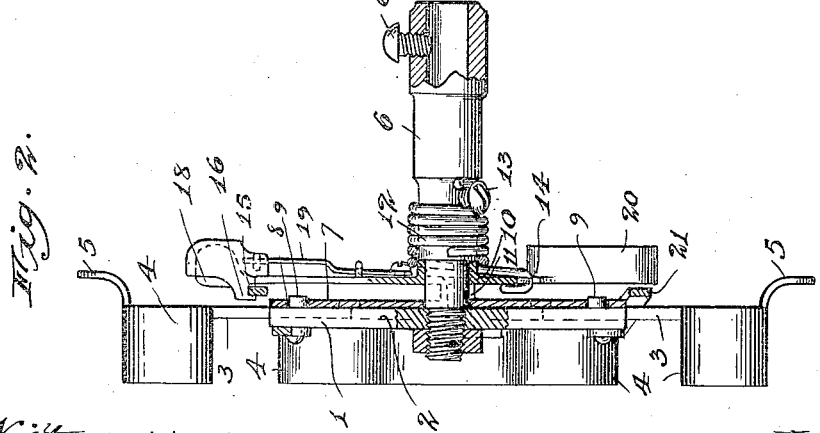

The invention consists in the matters hereinafter described, and more particularly pointed out in the appended claims.
In the accompanying drawing—Figure 1 is a plan view of that side of the chuck with which the axle stem or shaft connects; Fig. 2 is a view partly in side elevation and partly in section, taken approximately on line 2—2 of Fig. 1.

Referring to the drawings, 1 designates a cross-shaped frame plate, in each of the four radial arms of which is formed a channel or slideway 2, and in each of these slideways is mounted a radial arm 3 carrying at its outer end a block 4 and a guard 5. The guards in the present instance are formed as extensions of the arms 3.

With the center of the frame or spider 1 is rigidly connected an axis or shaft 6; this connection being shown in the present instance as made by providing a reduced extension or step on the extremity of the shaft which extends through the spider, terminates in a threaded portion and is provided with a clamping nut.

In order to effect the simultaneous and uniform radial movement of the arms or jaws 3, either inwardly or outwardly, a cam plate 7 is rotatably journaled upon the shaft 6 immediately adjacent to the upper side of the spider and so as to closely overlie and confine the sliding arms 3 in their channels. The cam plate 7 is provided with four spirally extending cam slots, designated 8, and a stud 9 fixed in each of the sliding arms takes into the corresponding cam slot and so forms an operative connection between the arms and cam.

In order to rotate the cam plate relatively to the cross frame or spider, an adjusting arm 10 is provided which in the present construction has a plate-like central enlargement which is rotatably journaled upon the shaft 6, and said plate member is fixed rigidly to the cam plate by means of a pair of screws 11, 11. The adjusting arm is spaced away from the cam plate, and spacing washers are therefore interposed between said parts, the screws 11 passing therethrough. A coiled spring 12 is provided, which is so connected with the adjusting arm and axis shaft as to tend to expand the chuck to its largest limit. For this purpose the main body of the spring is coiled around the axis shaft, one end of which is secured to a stud 13 fixed in said shaft, and the other end is connected to the adjusting arm, as indicated at 14. The outer end of the adjusting arm coöperates with a ratchet segment 15. This segment takes the form of a curved bar having its respective ends riveted or otherwise suitably secured to each of two of the spider arms; the ends of the ratchet bar being in this instance extended around behind the spider arms and secured to the back sides thereof so as to avoid interfering with the sliding arms. The end of the adjusting arm carries a spring-pressed pivotally mounted pawl 16 adapted to coöperate with the ratchet toothed segment. This pawl is of peculiar shape, being so constructed that it may be used as the finger-hold against which the pressure necessary to swing the arm is applied and may be tilted so as to either engage the ratchet teeth or tilted in the opposite direction so as to disengage the ratchet teeth without releasing the pressure applied to restrain the spring. To this end the pawl is approximately U-shaped, its pivotal support being formed as a tail-piece 16′ which lies just about centrally behind the finger-hold of the pawl and through which the pivot screw 17 is extended. A lug 18, formed as an integral part of the adjusting arm, extends outwardly from the main plane of the arm into the U-shaped bend of the pawl and serves as a stop to limit the oscillation of the pawl outwardly or in that direction to release it from the segment. A spring 19 rigidly secured at one end to the adjusting arm plate, and at its other end suitably engaging the pawl 16, serves to yieldably hold the latter in engagement. In order to counterbalance the weight of the pawl and lug on one end of the adjusting arm, said arm is extended at the opposite side of the main axis of the device and carries a counterweight 20. For a like reason a plain segmental bar 21 is mounted on the spider frame in a position diametrically opposed to the ratchet bar or segment 15.

The axis shaft 6 is provided with an axial socket adapting it to fit upon the end of a motor shaft and provided with a set-screw 6′ whereby it may be rigidly secured in place.

The operation of a device of this character is entirely obvious to those skilled in this art. It will be understood that these chucks are in use rotated at a high rate of speed, being usually driven by a small electric motor, upon the shaft of which the device is directly mounted. It becomes a matter of the utmost importance that the hat-holding jaws should not be thrown outwardly by centrifugal action under the high speed imparted to the chuck because if they are so thrown out they are more than apt to burst the hat. On the other hand, inasmuch as it is awkward to determine how much expanding tension should be applied in adjusting the chuck in the hat, it has been found most advantageous to rely upon an expanding spring for this purpose. By the use of applicant's construction, the hat can be placed in position with one hand, and with the thumb of the other hand bearing against one of the arms of the chuck the pawl can be drawn back so as to contract the chuck to permit the hat to be adjusted directly thereon, whereupon the adjusting arm is permitted to swing forwardly until the expanding blocks grip firmly against the interior of the hat, and then by slightly rocking the finger which holds the pawl but without releasing the holding pressure the pawl is caused to engage with that one of the ratchet teeth which happens to be in register. The expanding tension of the spring and centrifugal action both act against the backing up of the adjusting arm relatively to the ratchet segment, and the shape of the teeth positively prevents the adjusting arm from advancing beyond the notch where it is set. The result is that the hat is held firmly and reliably; that it may be adjusted to place almost instantly, and that there is no possibility of injuring it by the unintended expanding of the chuck.

The specific details of construction may be modified without departing from the invention, but the construction herein shown has proven highly successful and is a preferred embodiment.

I claim as my invention:

1. In a hat chuck of the general character described, the combination with a frame and expanding mechanism mounted thereon comprising a spring-actuated oscillatory member, of a ratchet-segment fixed on the frame, and a pawl moving with said oscillatory member and coöperating with said ratchet-segment.

2. In a hat chuck of the general character described, the combination with a frame member and a series of arms slidably connected with said frame member, of an oscillatory member mounted on said frame member, operative connections between said oscillatory member and said slidable arms whereby oscillatory movement of the former imparts sliding movement to the arms, a spring acting on said oscillatory member to rotate it in one direction, a ratchet member carried by the frame and a spring-pressed pawl moving with the oscillatory member and coöperating with the ratchet member.

3. In a hat chuck of the general character described, the combination with a frame member provided with radially disposed slideways and a series of arms slidably mounted in said ways, of an oscillatory arm-actuated member rotatably mounted on said frame, operative connections between said oscillatory member and said slidable arms whereby oscillatory movement of the former imparts sliding movement to the arms, a spring acting on said oscillatory member to rotate it in one direction, a ratchet-segment fixed upon the frame and arranged concentric with the axis of said oscillatory member, a part fixed upon and moving with said oscillatory member, and a pawl carried by said part and adapted to coöperate with the ratchet-segment.

4. In a hat chuck, the combination of a spider-like main frame provided with slideways formed upon each of its arms, slidable arms operatively mounted in said slidaways, an axis-shaft connected with the central part of said spider, a cam-plate journaled around said axis-shaft and provided with a series of spirally disposed cam-slots coöperatively engaging cam pins carried by the respective sliding arms, a coiled spring encircling said axis-shaft, having one of its ends connected to said axis-shaft and its other connected to a part moving with the cam-plate, a ratchet-segment mounted on the spider frame concentric of the axis of the cam-plate, an adjusting arm fixed to the cam-plate and extending adjacent to the ratchet-segment, and a spring-pressed pawl carried by said adjusting arm and adapted to coöperate with said ratchet-segment.

5. In a hat chuck, the combination of a spider-like main frame provided with slideways formed upon each of its arms, slidable arms operatively mounted in said slideways, an axis-shaft connected with the central part of said spider, a cam-plate journaled around said axis-shaft and provided with a series of spirally disposed cam-slots coöperatively engaging cam-pins carried by the respective sliding arms, a coiled spring encircling said axis-shaft, having one of its ends connected to said axis-shaft and its other connected to a part moving with the cam-plate, a ratchet-segment mounted on the spider frame concentric of the axis of the cam-plate, an adjusting arm fixed to the cam-plate and extending adjacent to the ratchet-segment, a combined finger-hold and pawl pivotally mounted on said adjusting arm and adapted to coöperate with the ratchet-segment, and a stop-lug upon said adjusting arm adapted to limit the oscillatory movement of the pawl in one direction.

JOHN H. CHENOWETH.

Witnesses:
ALBERT H. GRAVES,
EMILIE ROSE.

Copies of this patent may be obtained for five cents each, by addressing the "Commissioner of Patents, Washington, D. C."